United States Patent
Siira

[19]

[11] Patent Number: 5,825,760
[45] Date of Patent: Oct. 20, 1998

[54] TRANSMISSION METHOD AND A CELLULAR RADIO SYSTEM

[75] Inventor: Mikko Siira, Tokyo, Japan

[73] Assignee: Nokia Telecommunications Oy, Espoo, Finland

[21] Appl. No.: 774,780

[22] Filed: Dec. 30, 1996

[51] Int. Cl.⁶ .................................. H04Q 7/00; H04J 3/06
[52] U.S. Cl. .......................... 370/331; 370/519; 455/442
[58] Field of Search ................................. 455/436, 438, 455/439, 440, 442, 444, 449, 434; 370/331, 332, 335, 336, 350, 508, 503, 517, 519

[56] References Cited

U.S. PATENT DOCUMENTS

| | | | |
|---|---|---|---|
| 4,827,474 | 5/1989 | Le Goffic et al. ...................... | 370/347 |
| 5,195,091 | 3/1993 | Farwell et al. .......................... | 370/336 |
| 5,278,832 | 1/1994 | Binzel et al. ............................ | 370/347 |
| 5,317,571 | 5/1994 | Marcel et al. .......................... | 370/508 |
| 5,359,602 | 10/1994 | Diaz et al. .............................. | 370/401 |
| 5,483,668 | 1/1996 | Malkamaki et al. ..................... | 455/442 |
| 5,722,074 | 2/1998 | Muszinski ............................... | 455/442 |
| 5,734,836 | 3/1998 | Fujishima et al. ................. | 395/200.81 |

*Primary Examiner*—Hassan Kizou
*Assistant Examiner*—Soon-Dong Hyun
*Attorney, Agent, or Firm*—IP Group of Pillsbury Madison & Sutro LLP

[57] ABSTRACT

The invention relates to a transmission method and a cellular radio system comprising base stations and at least one vocoder, in which cellular radio system)the base stations and the vocoder transmit to each other a signal, the base stations transmitting signals to be vocoder substantially simultaneously, and wherein the vocoder receives the substantially simultaneously transmitted signals at different moments of reception, the cellular radio system comprising measuring means for measuring the delay difference between the different moments of reception of the signals received by the vocoder, and delaying means for delaying, if required, the signals to be transmitted to the base stations in such a way that the base stations receive the signals transmitted by the vocoder substantially simultaneously.

25 Claims, 3 Drawing Sheets

TRANSMISSION METHOD AND A CELLULAR RADIO SYSTEM

FIELD OF THE INVENTION

The invention relates generally to telecommunication systems. More precisely, the invention relates to a digital cellular radio system employing a soft hand-off.

BACKGROUND OF THE INVENTION

A typical cellular radio system comprises a fixed base station network, and a subscriber terminal communicates with one or more base stations of the network. A base station forwards the communication that arrives from a subscriber terminal. While moving or remaining stationary, subscriber terminals may transmit messages via the base stations both to each other and to subscriber terminals of other telephone systems. The transmission of messages is possible when the subscriber terminals are located in the coverage area of the base station network. In order for a subscriber terminal to be able to use the services provided by the cellular radio system, it should maintain a connection to at least one base station under all circumstances.

When a subscriber terminal does not use the services provided by the base station network, it does not need a connection to the base station network but it listens to the base stations in an idle mode. When the subscriber terminal moves in the base station network from the coverage area of one base station to the coverage area of another base station, this creates a need to change the channel or the base station.

In a typical cellular radio system, a subscriber terminal communicates only with one base station at a time, even though especially for example in a CDMA system the subscriber terminal may also communicate simultaneously with several base stations. In a prior art soft hand-off, the connection to the base station network is maintained despite the hand-off. In such a hand-off, the base station is usually changed. The prior art also comprises a softer hand-off where the base station is not changed, but the sector of the base station used is changed. A soft and a softer hand-off are called make-before-break-type hand-offs, which means that a new connection is set up for the subscriber terminal before the connection to the previous base station is terminated. The frequency band used is not changed in either hand-off.

A cellular radio system usually comprises a vocoder that source-encodes the signal and adapts the signal transmission rate to the transmission network, for example a Public Switched Telephone Network (PSTN). The vocoder may be placed for example in a TRAU (Transcoder/Rate Adaptor Unit) that is placed for example in connection with a base station controller or a mobile services switching centre. The TRAU forms TRAU frames that it transmits to the base station. The coding of the signal reduces the signal data rate for example in a transmission line to the base station. The vocoder and the base station transmit to and receive from each other a signal that consists of data packets that form TRAU frames.

In a soft hand-off, a subscriber terminal communicates with several base stations simultaneously. In a soft hand-off, the subscriber terminal transmits to the base stations a signal comprising the same information, the signals being forwarded to the vocoder. Also, the subscriber terminal receives signals comprising the same information from the base stations, which have received these signals from the vocoder.

In cellular radio systems, the signal routing from the vocoder to the different base stations varies considerably, and the length of the transmission path between the vocoder and a base station may be great. Especially the length of the transmission path causes a delay in the signal to be transmitted between the vocoder and a base station, wherefore the base stations receive the signals transmitted by the vocoder at different times. The length of the delay varies largely depending especially on the signal routing used. The delay causes problems during a soft hand-off, especially in the simultaneous transmission of a signal by the base stations to a subscriber terminal.

CHARACTERISTICS OF THE INVENTION

The object of the present invention is to realize a soft hand-off in such a manner that despite the delays in the radio system the base stations simultaneously transmit a signal to the subscriber terminal during a hand-off.

This is achieved with a transmission method according to the invention used in a cellular radio system comprising base stations and at least one vocoder, wherein a signal consisting of data packets is transmitted between the base stations and the vocoder, and wherein the base stations transmit a signal to the vocoder substantially simultaneously, and wherein the vocoder receives the substantially simultaneously transmitted signals at different moments of reception, the method comprising the steps of measuring the delay difference between the different moments of reception of the signals received by the vocoder, and delaying the signals to be transmitted to the base stations, if required, in such a way that the base stations receive substantially simultaneously the signals transmitted by the vocoder.

The invention also relates to a cellular radio system comprising base stations and at least one vocoder, in which cellular radio system the base stations and the vocoder transmit to each other a signal, the base stations transmitting signals to the vocoder substantially simultaneously, and in which system the vocoder receives the substantially simultaneously transmitted signals at different moments of reception, the cellular radio system comprising measuring means for measuring the delay difference between the different moments of reception of the signals received by the vocoder, and delaying means for delaying, if required, the signals to be transmitted to the base stations in such a way that the base stations receive substantially simultaneously the signals transmitted by the vocoder.

The arrangement according to the invention provides several advantages especially in a soft hand-off. The arrangement includes measuring the delay difference of the received signals and delaying the signals to be transmitted on the basis of the delay difference. In the arrangement according to the invention, the distance between the vocoder and the base stations is not significant for the invention. The signal received by the vocoder is framed. The different frames are detected by means of a frame number provided in the frame. The frame number makes it possible to distinguish the signals from one another. The signals are also delayed with a suitable delay. The suitably delayed signals arrive simultaneously at the base stations, which forward the signals simultaneously to a subscriber terminal. The framed signal used in the arrangement according to the invention forms a superframe, and increasing the length of the frame makes it possible to increase the tolerance of the signal delay difference.

DESCRIPTION OF THE FIGURES

In the following, the invention will be described in greater detail with reference to the examples according to the accompanying drawings, in which.

DESCRIPTION OF THE PREFERRED EMBODIMENTS

Figure 1:
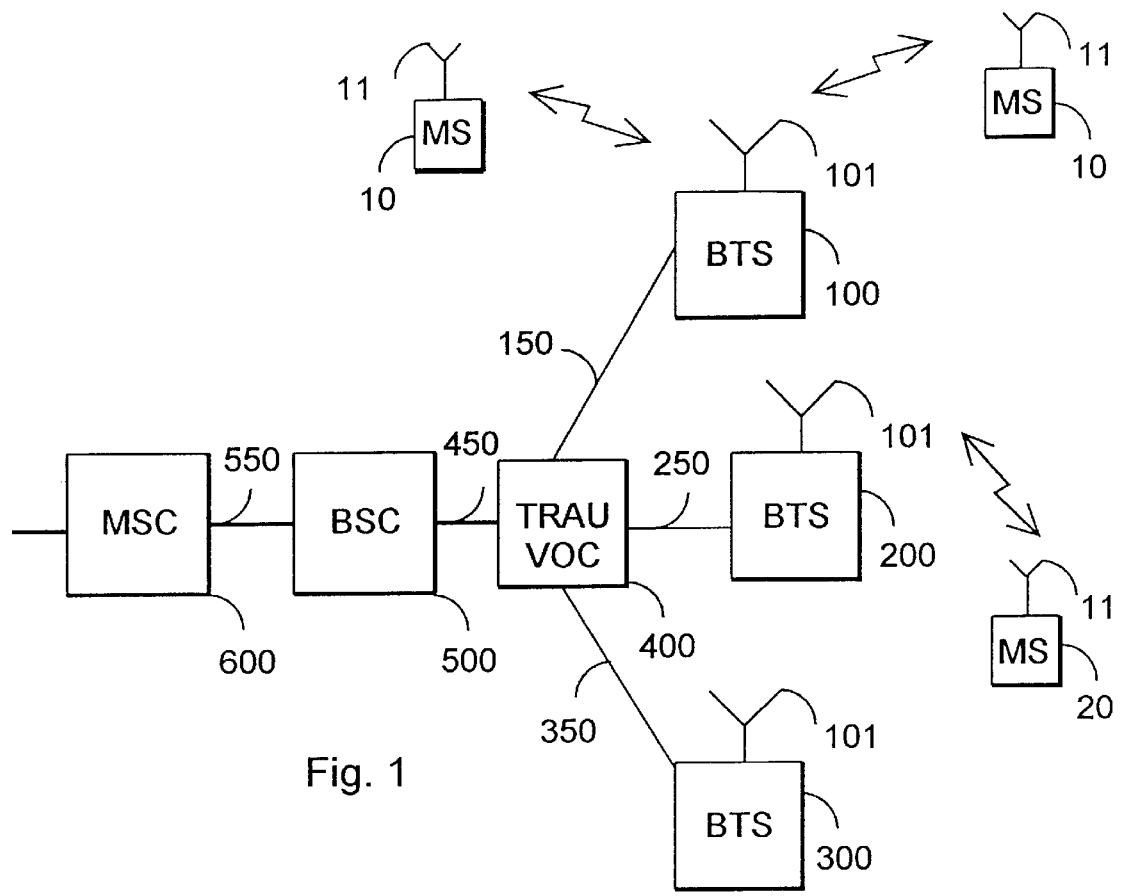
FIG. 1 shows a cellular radio system where the method according to the invention is utilized.

FIG. 1 shows a cellular radio system where the method according to the invention is utilized. The arrangement according to the invention is applicable for use in spread spectrum systems, especially in CDMA systems, without restricting the invention to the aforementioned systems, however. The cellular radio system comprises a number of subscriber terminals 10, 20, base stations 100, 200, 300, a base station controller 500, and a mobile services switching centre 600. The function of the base station controller 500 is to control the base stations 100, 200, 300. The cellular radio system further comprises a vocoder 400 that acts as a speech coder. As regards speech coding, the vocoder 400 is realized according to known technology. The subscriber terminals 10, 20 shown in the figure are in practice for example mobile phones.

The mobile services switching centre 600 is connected by a transmission link 550 to the base station controller 500. The base station controller 500 is connected to the vocoder 400 by a transmission link 450. The vocoder 400 communicates via a transmission link 150 with the base station 100, via a transmission link 250 with the base station 200, and via a transmission link 350 with the base station 300. The transmission links 150, 250, 350, 450 and 550 are implemented for example with PCM technique. These transmission links can also be realized for example with radio links. In the arrangement shown in the figure, the vocoder 400 is placed between the base station controller 500 and the base stations 100, 200, 300. However, the vocoder 400 may also be located in some other part of the cellular radio system, for example in connection with the base station controller 500 or the mobile services switching centre 600. The subscriber terminals 10, 20 shown in the figure comprise an antenna 11. The base stations 100, 200, 300 comprise an antenna 101. The antennas 11, 101 operate as transceiver antennas.

Figure 2:
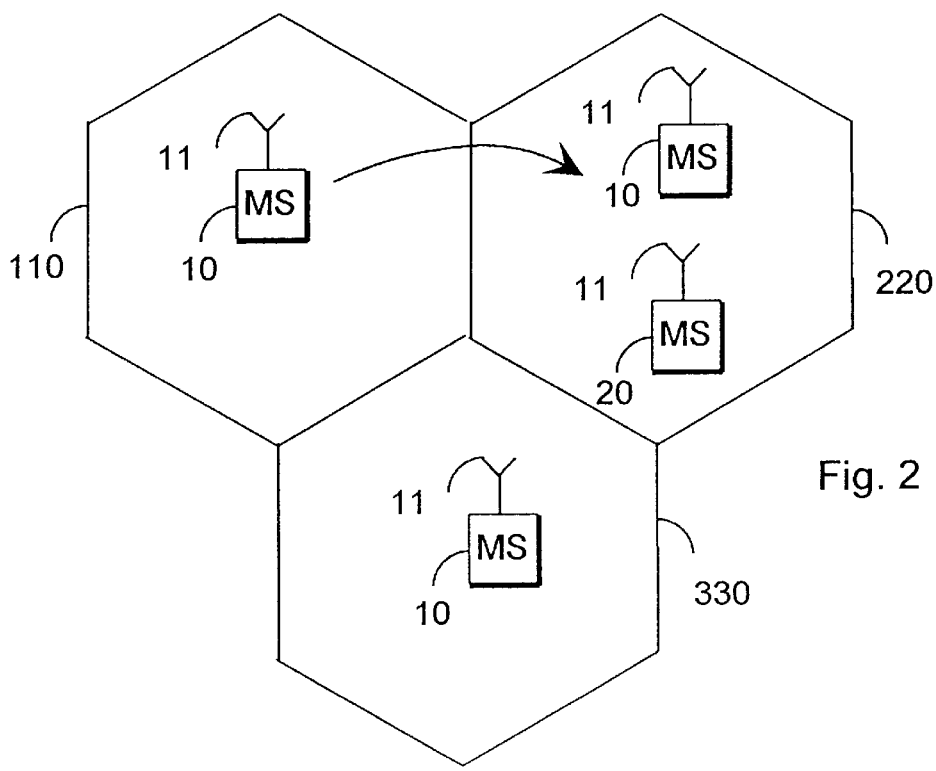
FIG. 2 shows the movement of a subscriber terminal in the cellular radio system during a hand-off.

FIG. 2 shows the movement of the subscriber terminal 10 in the cellular radio system during a hand-off. The figure shows that each base station 100, 200, 300 has its own coverage area 110, 220, 330. The subscriber terminal 10 moves at first in the coverage area 110 of the base station 100. If the subscriber terminal 10 sets up a connection to some other subscriber terminal 20, the subscriber terminal 10 transmits a signal to the base station 100. The signal propagates via the transmission link 150 to the vocoder 400 from where the signal further propagates along a path according to known technology to the other subscriber terminal 20. The propagation of the signal from the subscriber terminal 10 via the base station 100, 200, 300 to the vocoder 400 is called a reverse direction.

If the subscriber terminal 10 sets up a connection with the subscriber terminal 20 situated in the coverage area 220 of the base station 200, the signal propagates along a path according to known technology for example to the base station controller 500. The signal propagates from the base station controller 500 to the vocoder 400. The vocoder 400 transmits the signal via the transmission link 250 to the base station 200. The base station 200 transmits the received signal via the radio path to the subscriber terminal 20. The propagation of the signal from the vocoder 400 to the base station 100, 200, 300 and further from the base station to the subscriber terminal 10, 20 is called a forward direction. The signal is delayed, depending on the structure of the cellular radio system, as it propagates between the different network elements of the system, such as the base stations 100, 200, 300, the vocoder 400 and the base station controller 500. The base stations 100, 200, 300 also cause a delay when they process the signal. It can be assumed, however, that the base stations 100, 200, 300 cause a processing delay that is of substantially equal length. It can also be assumed that the delay occurring in the air interface between the base stations 100, 200, 300 and the subscriber terminal 10 is substantially equal at all the base stations 100, 200, 300 communicating with the subscriber terminal 10.

The vocoder 400 and the base station 100, 200, 300 transmit to each other data packets in a signal that is framed. The data packets comprise a frame number field that is given values for example from zero to three. The frames form a superframe, and the frame number depends on the location of the frame in the superframe. The length of the superframe is typically for example 80 ms, and the length of the data packet is 20 ms. The data packets transmitted by the base stations 100, 200, 300 are synchronized, so that the base stations transmit a signal simultaneously in the reverse direction.

Assume that the subscriber terminal 10 sets up a connection to the other subscriber terminal 20. The subscriber terminal 10 moves during the connection from the coverage area 110 of the base station 100 to the coverage area 220 of the base station 200, in a manner shown in FIG. 2. When a transition from one coverage area to another occurs, the cellular radio system employs a soft hand-off so that the connection set up by the subscriber terminal 10 would not be cut off or interfered with. During a soft hand-off, the subscriber terminal 10 communicates simultaneously with both base stations 100, 200 that transmit a reverse signal containing the same data to the vocoder 400. The vocoder 400 also transmits to each base station 100, 200 a forward signal comprising the same information. The base stations 100, 200 thereafter transmit the signal they have received to the subscriber terminal 10.

Figure 3:
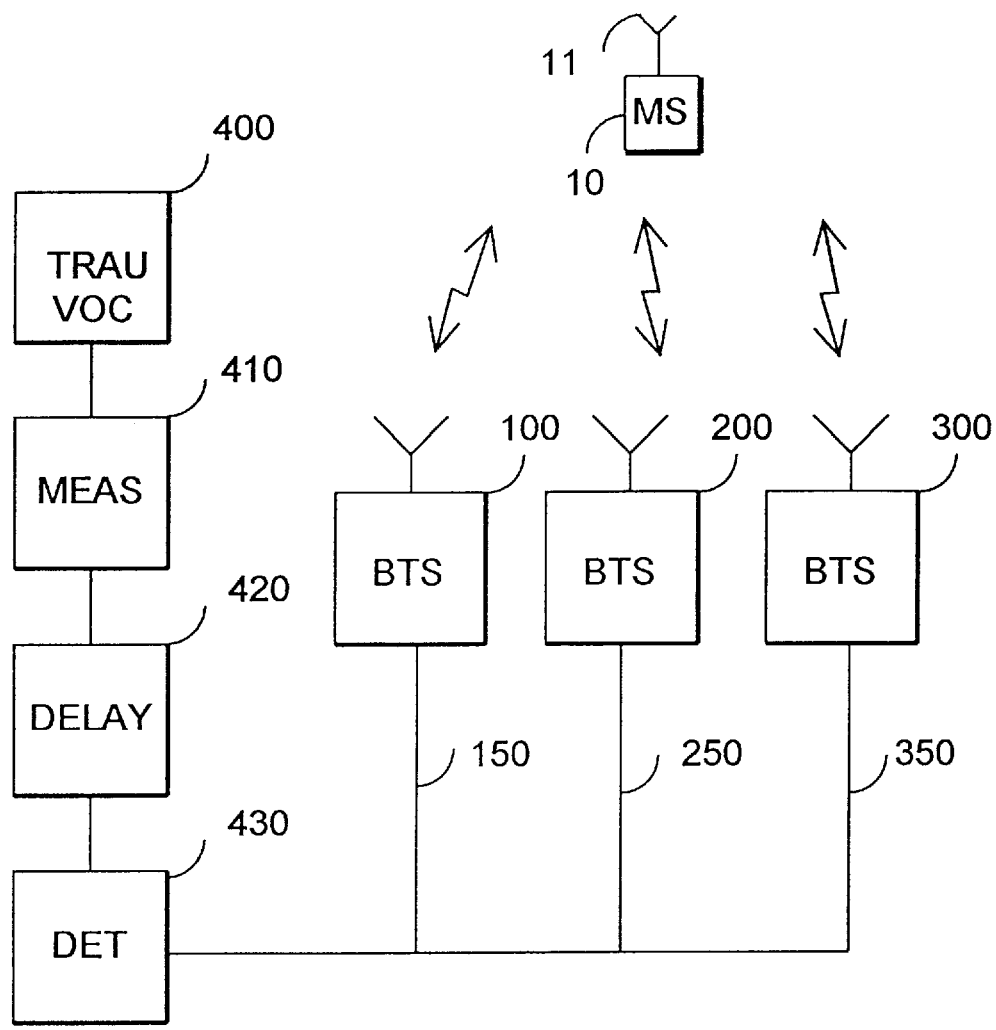
FIG. 3 is a block diagram illustrating in greater detail the structure of the cellular radio system according to the invention.

FIG. 3 is a block diagram illustrating in greater detail the structure of the cellular radio system according to the invention. A delay occurring especially in the signal to be transmitted between the vocoder 400 and the base station 100, 200, 300 causes problems especially during a hand-off. The cellular radio system according to the invention comprises measuring means 410 (MEAS) for measuring the delay difference between the moments of reception of the signals received by the vocoder 400. The delay difference is measured from the moment when these signals comprising the same data arrive at the vocoder 400. The delay difference of the signals over the transmission links 150, 250, 350 between the vocoder 400 and the base stations 100, 200, 300 may be substantially at most half of the length of the superframe in the reverse and the forward direction. However, the allowed delay difference can be increased, if necessary, by increasing the length of the superframe.

The cellular radio system also comprises delaying means 420 (DELAY). The delaying means 420 delay, if required, the signals transmitted by the vocoder 400 to the base station 100, 200, 300. Due to the delay, the base stations 100, 200, 300 receive the signals transmitted by the vocoder 400 substantially simultaneously, even though there would be a delay in the signal transmission. The delaying means 420 delay the signal on the basis of the delay measurements carried out by the measuring means 410. The delay difference of the signals that are received by the base stations 100, 200, 300 and that contain the same data can be substantially at most equal to the length of the data packet constituting a signal. The length of the data packet typically corresponds to a period of 20 ms.

Assume that during a hand-off, the subscriber terminal 10 transmits a signal to the base stations 100, 200, 300. The base stations 100, 200, 300 receive the signal and forward it to the vocoder 400. The base stations 100, 200, 300 transmit the signal to the vocoder 400 substantially simultaneously. Since the routing of the signals to the vocoder 400 is different, the signals are provided with delays of different lengths. Assume also that the signal propagating along the transmission link 250 arrives at the vocoder 400 for example one millisecond before the signal propagating along the transmission link 350. The measuring means 410 measure the signal transmitted by the base stations 200, 300 and obtain the aforementioned one millisecond as the delay difference between the signals. The data about the delay difference measured by the measuring means 410 in the reverse direction is supplied to the delaying means 420, which delay the signal to be transmitted in the forward direction along the transmission link 250 to the subscriber terminal 10. Due to the delay, the signals transmitted by the vocoder 400 arrive at the base stations 100, 200, 300 substantially simultaneously, whereafter the data packets can be transmitted substantially simultaneously to the subscriber terminal 10.

The cellular radio system also comprises detecting means 430 (DET) for detecting and identifying the data packets transmitted from the different base stations 100, 200, 300 from the signal received by the vocoder 400. The detecting means 430 detect and identify the different data packets on the basis of the frame numbers. The delaying means 420 delay the data packets having the same frame number as the frame received by the vocoder 400 on the basis of the detection and identification carried out by the detecting means 430. If the signal received and transmitted by the vocoder 400 comprises the same frame numbers, the frame numbers correspond to each other. The measuring means 410, the delaying means 420, and the detecting means 430 comprised by the cellular radio system are preferably located in a TRAU acting as the vocoder. In FIG. 3, the measuring means 410, the delaying means 420 and the detecting means 430 are placed between the vocoder and the base stations 100, 200, 300. The aforementioned means 410, 420, 430 can also be placed in some other part of the cellular radio system, however.

Figure 4:
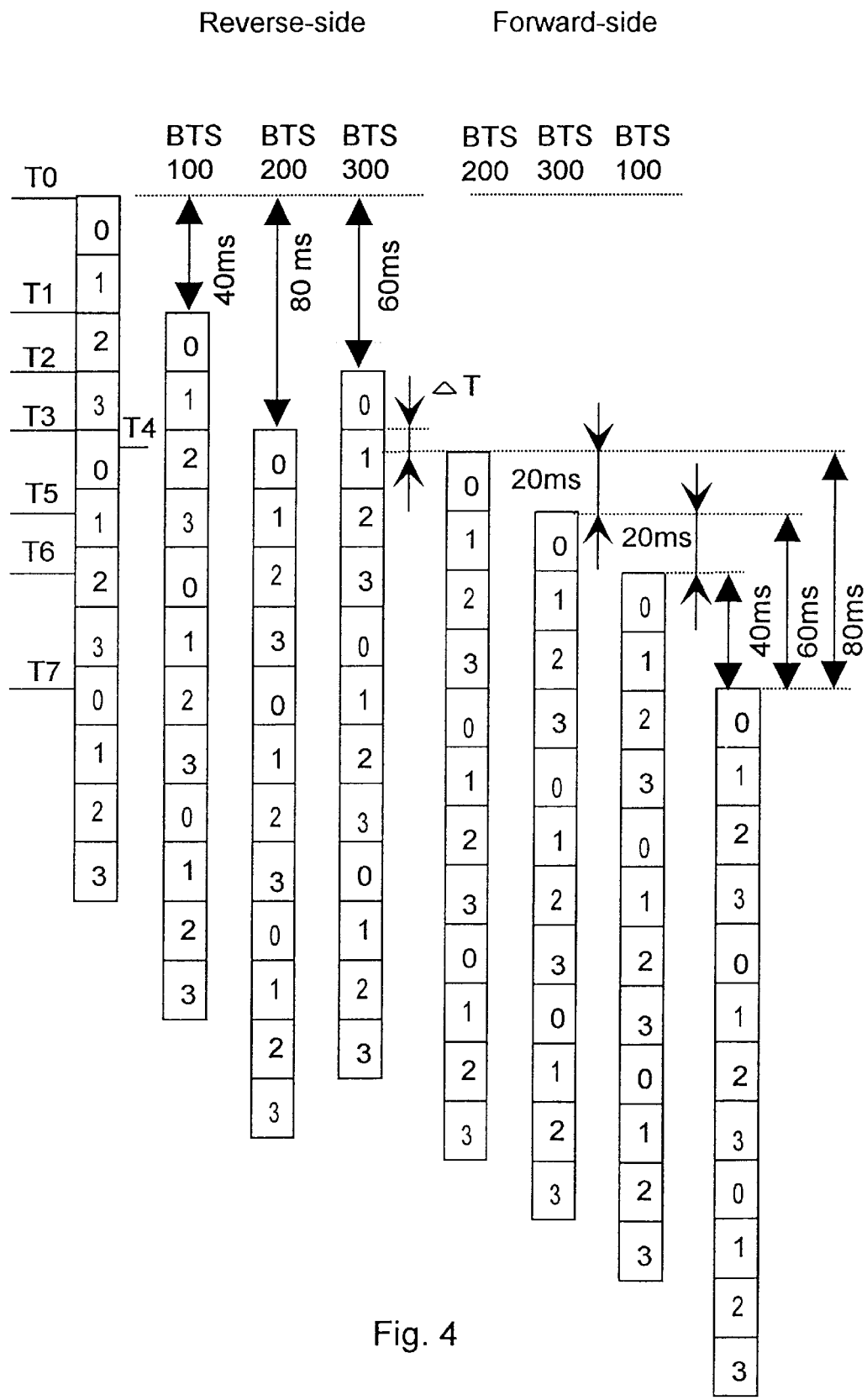
FIG. 4 shows schematically the timing of the delay of signals.

FIG. 4 shows schematically the timing of the delay of a signal that consists of data packets. More precisely, the figure shows the delay of the signals of the three base stations 100, 200, 300 and the vocoder 400 in the reverse and the forward direction. In the figure, the base stations 100, 200, 300 transmit their signals substantially at the same moment T0 to the vocoder 400. It is assumed in the figure that the passage of time begins when the base stations 100, 200, 300 start transmitting signals. The measuring means 410 measure the signal delay differences on the basis of the moments of reception of the signals received by the vocoder 400. The vocoder 400 receives first, at a moment T1=40 ms, a signal transmitted by the base station 100. It has therefore taken 40 ms for the signal transmitted by the base station 100 to arrive at the vocoder 400. The signal transmitted by the base station 200 is received at the vocoder 400 at a moment T3=80 ms. Further, the signal transmitted by the base station 300 is received at the vocoder 400 at a moment T2=60 ms. The base stations 100, 200, 300 transmit signals in frames that are indicated by 0 to 3. In the example shown in the figure, the base stations 100, 200, 300 start transmission from the frame with the frame number of zero.

The signal transmitted by the base station 200 therefore arrives at the vocoder 400 last of all the signals transmitted by the three base stations 100, 200, 300. This means that there has been a longer delay between the base station 200 and the vocoder 400 than over the routing between the base stations 100, 300 and the vocoder 400. The delaying means 420 start delaying the signals after the moment of reception T3 of the signal that arrived the last. More precisely, the delay begins a moment $\Delta T$ after the moment T3. The delaying means 420 delay the signals in the forward direction. The delaying means 420 delay the signals on the basis of the delay measurements carried out by the measuring means 410 in the reverse direction. The vocoder 400 transmits to the base station 200 a frame indicated with the frame number of zero a moment $\Delta T$ after the last frame has been received. This means that the frame indicated with the frame number of zero is transmitted first at a moment $T4=\Delta T+T3$ to the base station 200. In the arrangement shown in the figure, the moment $\Delta T$ is short compared to the length of the frame, for example.

The vocoder 400 transmits next a frame indicated with the frame number of zero to the base station 300. The transmission takes place at a moment $T5=\Delta T+T3+(T3-T2)$. The frame to the base station 300 is thus transmitted 20 ms after the transmission to the base station 200. The vocoder 400 transmits last a frame indicated with the frame number of zero to the base station 100. The transmission takes place at a moment $T6=\Delta T+T3+(T2-T1)$. The transmission to the base station 100 takes place 40 ms after the transmission to the base station 200. In the arrangement according to the invention, the signal processing operations carried out by the vocoder 400 in the reverse and the forward direction are not synchronized. Further, the vocoder 400 does not have to be synchronized with the base stations 100, 200, 300. In the arrangement according to the invention, the total delay of the signal is not significant and it does not have to be measured. Instead, the signal delay difference is significant. When the vocoder has suitably delayed the data packets to be transmitted to the base station, the data packets arrive at the base stations 100, 200, 300 simultaneously. In the arrangement shown in FIG. 4, the base stations 100, 200, 300 receive the signals that the vocoder 400 has transmitted at different times at substantially the same moment T7. During a hand-off, the signals that arrive simultaneously at the base stations 100, 200, 300 easily enable the simultaneous transmission of the signals also to the subscriber terminal 10. Changing the length of the time $\Delta T$ enables minimizing the forward delay at the base stations. In other words, when the length of the period $\Delta T$ is changed, it is possible to adjust the forward signals in such a way that the signals arrive at the base stations 100, 200, 300 as close to the synchronized transmission moment of the air interface of the base stations 100, 200, 300 as possible. The delaying means 420 adjust the length of the period $\Delta T$ advantageously.

Even though the invention is described above with reference to the example according to the accompanying drawings, it is clear that the invention is not restricted thereto, but it can be varied in several ways within the scope of the inventive idea disclosed in the appended claims.

I claim:

1. A transmission method used in a cellular radio system comprising base stations and at least one vocoder, wherein a signal consisting of data packets is transmitted between each base station and the vocoder, and wherein each base station transmits a signal to the vocoder substantially simultaneously, and wherein the vocoder receives the substantially simultaneously transmitted signals at different moments of reception, the method comprising the steps of measuring the delay difference between the different moments of reception of the signals received by the vocoder, and delaying the signals to be transmitted to the base stations, if required, in such a way that the base stations receive substantially simultaneously the signals transmitted by the vocoder.

2. A method according to claim 1, wherein the signals are delayed on the basis of the delay differences obtained in the measurement.

3. A method according to claim 1, wherein the signal is delayed with a delay difference equal to the difference between the moment of receiving the signal and the moment of receiving the signal preceding said signal.

4. A method according to claim 1, wherein the vocoder transmits the first delayed signal after the moment when it has received the last signal transmitted from the base stations.

5. A method according to claim 1, further comprising the step of delaying the most the signal to be transmitted to the base station the signal of which is received first by the vocoder.

6. A method according to claim 1, further comprising the step of delaying the least the signal to be transmitted to the base station the signal of which is received last by the vocoder.

7. A method according to claim 1, the method employing a framed signal, the frames being provided with a number on the basis of which the signals having the same frame number are detected and identified from the signal received by the vocoder.

8. A method according to claim 7, wherein the signals to be transmitted from the vocoder are delayed on the basis of the detection and identification.

9. A method according to claim 1, the method employing a framed signal used to form a superframe consisting of several frames.

10. A method according to claim 9, wherein the length of the superframe is at least double compared to the delay difference between the different signals received by the vocoder.

11. A method according to claim 1, the method being used during a soft hand-off in a cellular radio system comprising at least one subscriber terminal communicating simultaneously with several base stations.

12. A method according to claim 1, wherein the transmission moments of the signals to be transmitted by the vocoder to the base stations are adjusted in such a way that the signals arrive at the base stations substantially at the synchronized moment of transmission of the air interface of the base stations.

13. A cellular radio system comprising base stations and at least one vocoder, in which cellular radio system the base stations and the vocoder transmit to each other a signal, base station transmitting a signal to the vocoder substantially simultaneously, and in which system the vocoder receives the substantially simultaneously transmitted signals at different moments of reception, the cellular radio system comprising measuring means for measuring the delay difference between the different moments of reception of the signals received by the vocoder, and delaying means for delaying, if required, the signals to be transmitted to the base stations in such a way that the base stations receive substantially simultaneously the signals transmitted by the vocoder.

14. A cellular radio system according to claim 13, wherein the signals are delayed on the basis of the delay differences obtained from the measuring means.

15. A cellular radio system according to claim 13, wherein the delaying means delay the signal with a delay difference equalling the interval between the moment of receiving the signal and the moment of receiving the signal preceding said signal.

16. A cellular radio system according to claim 13, wherein the vocoder transmits the first delayed signal after the moment when it has received the last signal transmitted from the base stations.

17. A cellular radio system according to claim 13, wherein the delaying means delay the most the signal to be transmitted to the base station the signal of which is received first by the vocoder.

18. A cellular radio system according to claim 13, wherein the delaying means delay the least the signal to be transmitted to the base station the signal of which is received last by the vocoder.

19. A cellular radio system according to claim 13, the system employing a framed signal used to form a superframe consisting of several frames.

20. A cellular radio system according to claim 13, the system employing a framed signal and comprising detecting means for detecting and identifying the signals having the same frame number from the signal received by the vocoder.

21. A cellular radio system according to claim 20, wherein the delaying means delay the signals to be transmitted on the basis of the detection and identification.

22. A cellular radio system according to claim 20, wherein the vocoder forms a superframe from the framed signal and wherein the delay difference of the signals received by the vocoder is at most half of the length of the superframe.

23. A cellular radio system according to claim 13, wherein the signal consists of data packets and wherein the delay difference between the signals received by the different base stations is at most double compared to the length of a data packet.

24. A cellular radio system according to claim 13, the system comprising at least one subscriber terminal which communicates simultaneously with several base stations during a soft hand-off.

25. A cellular radio system according to claim 13, wherein the delaying means adjust the transmission moments of the signals to be transmitted by the vocoder to the base stations in such a way that the signals arrive at the base stations substantially at the synchronized transmission moment of the air interface of the base stations.

* * * * *